(12) United States Patent
Strevig, III et al.

(10) Patent No.: US 11,875,099 B2
(45) Date of Patent: Jan. 16, 2024

(54) NOISE IMPACT ON FUNCTION (NIOF) REDUCTION FOR INTEGRATED CIRCUIT DESIGN

(71) Applicant: International Business Machines Corporation, Armonk, NY (US)

(72) Inventors: Gerald L Strevig, III, Cedar Park, TX (US); Adam P. Matheny, Hyde Park, NY (US); Alice Hwajin Lee, Belmont, MA (US); Jose Luis Pontes Correia Neves, Poughkeepsie, NY (US)

(73) Assignee: International Business Machines Corporation, New Armonk, NY (US)

( * ) Notice: Subject to any disclaimer, the term of this patent is extended or adjusted under 35 U.S.C. 154(b) by 283 days.

(21) Appl. No.: 17/397,197

(22) Filed: Aug. 9, 2021

(65) Prior Publication Data
US 2023/0038399 A1 Feb. 9, 2023

(51) Int. Cl.
*G06F 30/327* (2020.01)
*G06F 30/394* (2020.01)
*G06F 119/10* (2020.01)

(52) U.S. Cl.
CPC .......... *G06F 30/327* (2020.01); *G06F 30/394* (2020.01); *G06F 2119/10* (2020.01)

(58) Field of Classification Search
USPC ........................................................ 716/115
See application file for complete search history.

(56) References Cited

U.S. PATENT DOCUMENTS

| | | | |
|---|---|---|---|
| 6,272,668 B1 * | 8/2001 | Teene | G06F 30/39 |
| | | | 716/113 |
| 6,678,870 B2 | 1/2004 | Okada et al. | |
| 7,010,763 B2 | 3/2006 | Hathaway et al. | |
| 7,062,731 B2 | 6/2006 | Tetelbaum | |
| 7,062,737 B2 | 6/2006 | Tetelbaum et al. | |
| 7,093,223 B2 | 8/2006 | Becer et al. | |
| 7,685,549 B2 | 3/2010 | Sinha et al. | |
| 7,962,876 B2 | 6/2011 | Oh et al. | |
| 2004/0199879 A1 | 10/2004 | Bradfield et al. | |
| 2005/0060675 A1 | 3/2005 | Tetelbaum | |
| 2006/0031796 A1 * | 2/2006 | Meaney | G06F 30/30 |
| | | | 716/113 |
| 2006/0112359 A1 | 5/2006 | Becer et al. | |
| 2006/0206843 A1 | 9/2006 | Zarkesh-Ha et al. | |
| 2007/0226673 A1 | 9/2007 | Habitz et al. | |

(Continued)

OTHER PUBLICATIONS

Becer et al.; "Crosstalk Noise Control in an SoC Physical Design Flow"; IEEE Transactions on Computer-Aided Design of Integrated Circuits and Systems; vol. 23, No. 4; Mar. 30, 2004; pp. 488-497.

(Continued)

*Primary Examiner* — Mohammed Alam
(74) *Attorney, Agent, or Firm* — CANTOR COLBURN LLP; Kelsey Skodje

(57) ABSTRACT

Examples described herein provide a computer-implemented method that includes identifying, by a processing device, a victim/aggressor pair of nets for an integrated circuit. The method further includes severing nets of the victim/aggressor pair of nets. The method further includes swapping severed segments of the nets. The method further includes rerouting the nets subsequent to swapping the severed segments of the nets.

20 Claims, 9 Drawing Sheets

(56) References Cited

U.S. PATENT DOCUMENTS

2013/0275110 A1* 10/2013 Kartschoke ............ G06F 30/337
                                                    703/14
2017/0177784 A1*  6/2017 Kalafala ................ G06F 30/367
2021/0073346 A1*  3/2021 Neves .................... G06F 30/367
2023/0038399 A1*  2/2023 Strevig, III ........... G06F 30/398

OTHER PUBLICATIONS

Chakraborty et al.; "A Signal Integrity-Driven Buffer Insertion Technique for Post-Routing Noise and Delay Optimization"; Proceedings of the IEEE 2002 Custom Integrated Circuits Conference (CAT. No. 02CH37285); May 15, 2002; pp. 23-26.

Duarte et al.; "Thermal Sensor Variation Reduction in Deep Sub 100nm Process Technologies"; IEEE Sensors 2010 Conference; 2010; pp. 1382-1385.

List of IBM Patents or Patent Applications Treated as Related; Appendix P Filed Aug. 9, 2021; 2 Pages.

\* cited by examiner

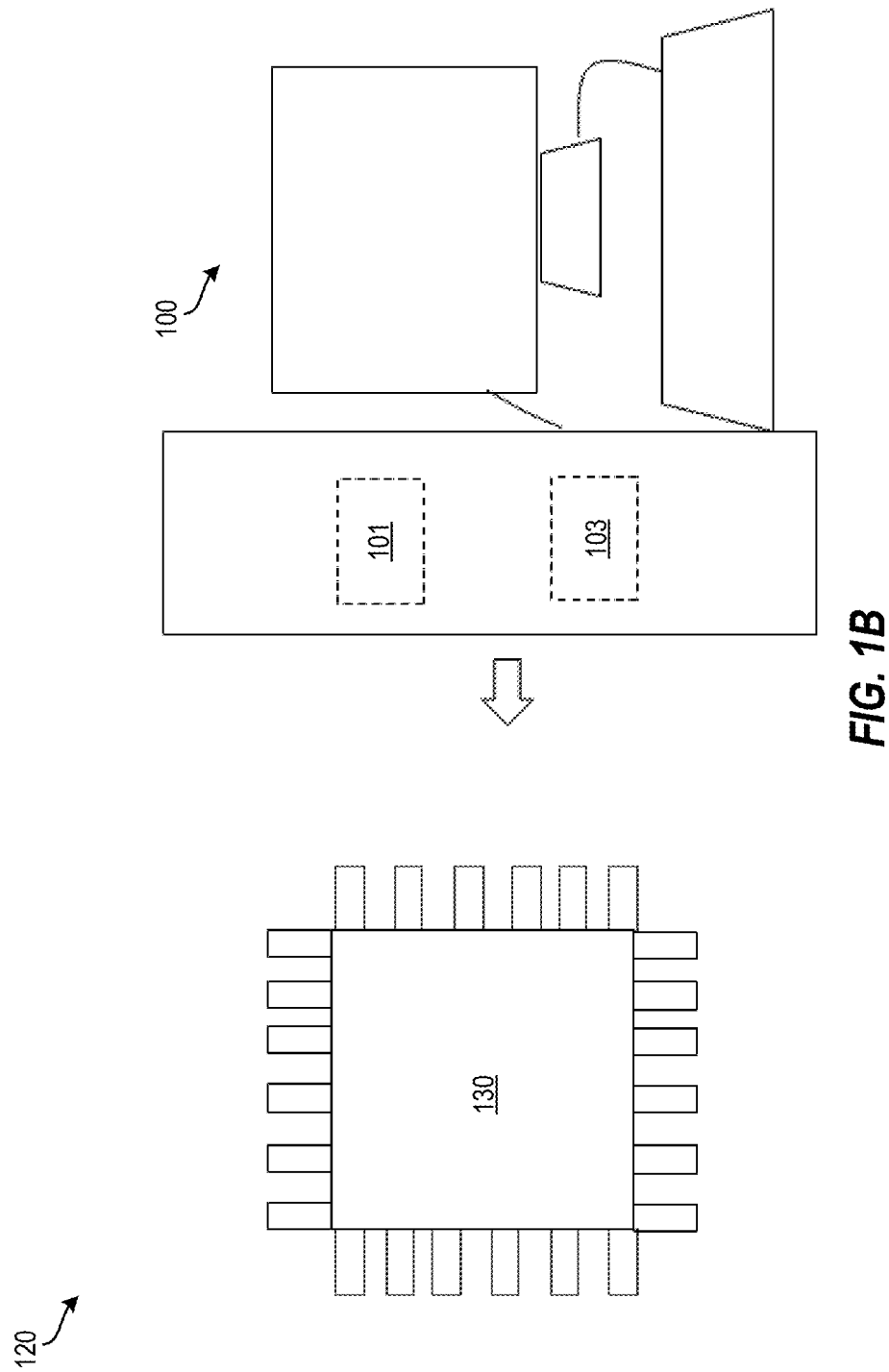

NOISE IMPACT ON FUNCTION (NIOF) REDUCTION FOR INTEGRATED CIRCUIT DESIGN

BACKGROUND

Embodiments described herein generally relate to integrated circuits (ICs), and more specifically, to noise impact on function (NIOF) reduction for an IC design.

In an IC, signal coupling may potentially generate timing failures and/or logic failures. In a timing failure, additional delay due to capacitive coupling effects may increase slack and/or signal slew in the IC, leading to timing errors. In a logic (or functional) failure, a voltage signal due to capacitive coupling may be high and/or wide enough to change the signal state at an input of a logic device such that the output state of the logic device is flipped, leading to propagated logic errors. An IC design may be examined for such errors before manufacturing of a physical IC based on the IC design.

SUMMARY

Embodiments of the present invention are directed to noise impact on function (NIOF) reduction for an integrated circuit (IC) design.

A non-limiting example computer-implemented method includes identifying, by a processing device, a victim/aggressor pair of nets for an integrated circuit. The method further includes severing nets of the victim/aggressor pair of nets. The method further includes swapping severed segments of the nets. The method further includes rerouting the nets subsequent to swapping the severed segments of the nets.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 1B depicts a block diagram of a system to perform NIOF reduction for an IC design according to one or more embodiments described herein;

Figure 1A:
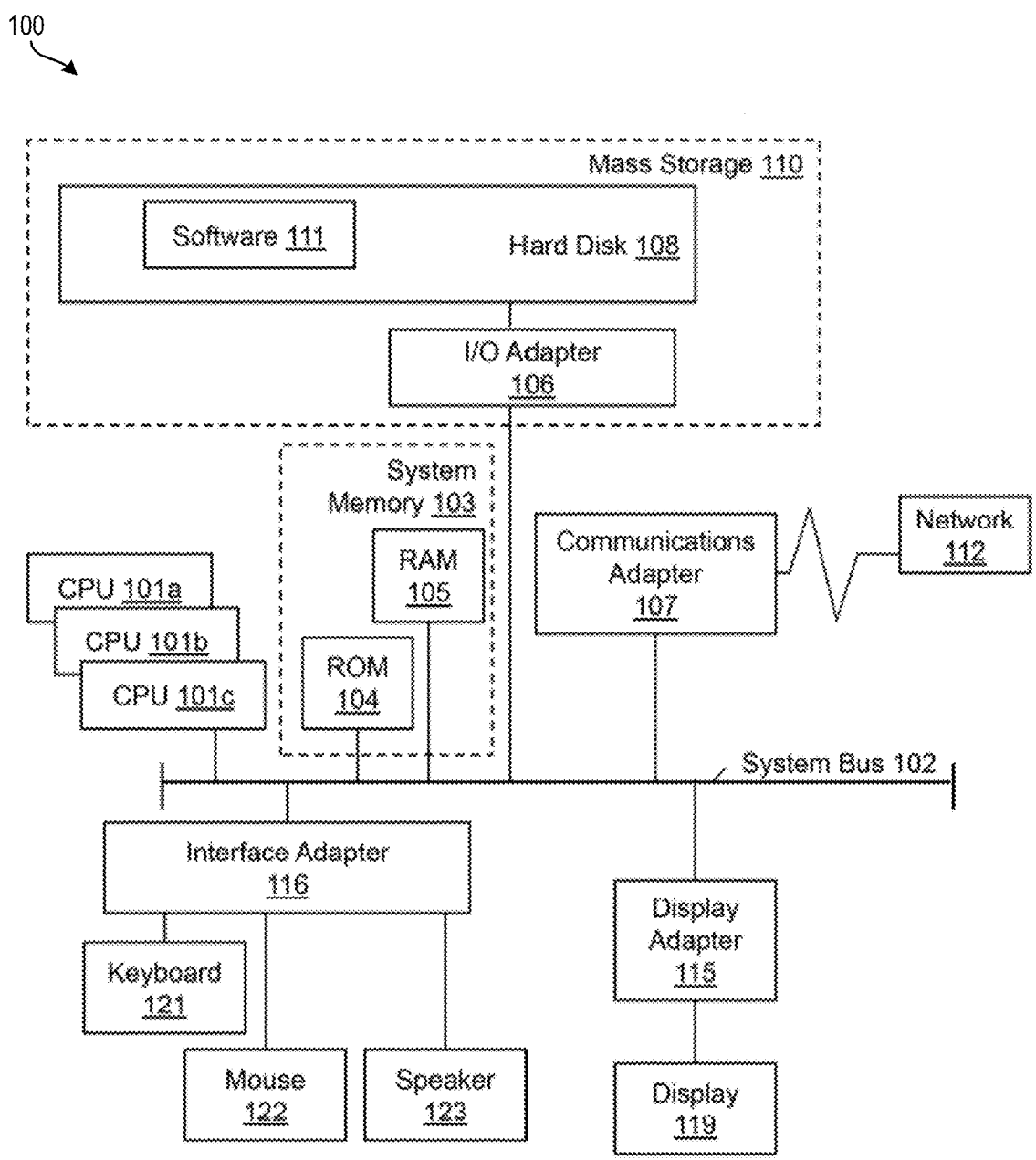
FIG. 1A depicts a block diagram of an example computer system for use in conjunction with one or more embodiments of noise impact on function (NIOF) reduction for an integrated circuit (IC) design.

The diagrams depicted herein are illustrative. There can be many variations to the diagrams or the operations described therein without departing from the scope of the invention. For instance, the actions can be performed in a differing order or actions can be added, deleted or modified. Also, the term "capacitive coupled" and variations thereof describes having a communication path between two adjacent elements through an electric field and does not imply a direct physical connection between the elements with no intervening elements/connections between them. All of these variations are considered a part of the specification.

DETAILED DESCRIPTION

One or more embodiments of the present invention provide noise impact on function (NIOF) reduction for an integrated circuit (IC) design. In a NIOF, or functional, failure, a gate in a victim net in the IC design changes its output logic state (signal switching) due to noise that is injected into one or more inputs of the gate. The noise injection may occur because of capacitive coupling in the IC, due to routed signals being relatively close to one another such that sufficient voltage is generated to change the signal state in the victim net. Shielding or separating the wires to eliminate the capacitive coupling may not be possible due to space constraints.

Various correction techniques may be applied to incrementally correct NIOF failures in a 3-dimensional wired IC design, including but not limited to gate repower, gate threshold voltage (Vt) swap, moving a wire or net to different layers in the IC design (e.g., promotion or demotion), increasing the physical space between a victim net and neighboring nets (e.g., aggressor nets), and inserting a buffer into the victim net to reduce capacitive coupling. The capacitive coupling to a victim net (e.g., a line) may be reduced with the addition of a buffer in the midpoint of the coupling line. Noise may also be reduced by isolating a net or wire by moving the net or wire up to a next layer (promoting) or down to a lower layer (demoting) in the IC chip. The term net may refer to a logical connection, and the term wire may refer to a physical connection.

NIOF reduction for an IC design may include application of various correction techniques to the IC design through multiple iterations. There may be a maximum number of iterations (e.g., a limit) defined for NIOF reduction in some embodiments. In the 3-dimensional routing domain, a functional failure in a victim net may be caused by noise contributions from multiple different neighboring nets (e.g., aggressor nets). Determining and reducing the noise contributed by each of the neighboring nets to fix the NIOF failure may be a complex process due to the dual nature of an NIOF failure. A net identified as a victim is also an aggressor to its aggressor(s). The level of coupling and signal strength determines whether aggressors are also in the initial victims list. However, there are many cases where the coupling to an aggressor may not be enough to generate a signal that identifies the aggressor as also being a victim. The nets identified as aggressors and victims may change as fixes are applied to a current list of victims. For example, the insertion of a buffer on a victim net reduces and/or fixes the NIOF fail on the victim net. At the same time, the insertion of the buffer also changes the noise profile of the victim with respect to its aggressors, potentially increasing the victim's coupling contribution into the aggressors. In some aggressors, this increase maybe enough for the coupling signal to reach or exceed the limits to classify the aggressor net as a victim. An IC design may be analyzed after a NIOF fix, and the list of victim nets may be updated to account for new victim nets not only in the original set of victim nets and associated aggressors, but also any other net in the design. Each of the multiple aggressor nets may be examined individually to determine which noise contributors may be modified to correct the NIOF failure with relatively low impact on the overall IC design. Neighboring nets that fail due to a change (e.g., a buffer being added, or a wire rerouting) in a victim net or an aggressor net may be identified and corrected. The set of failing nets may be dynamically updated as functional failures are corrected in the IC design. The dynamic updating may reduce a number of functional failures in the IC without creating noise impact on timing (NIOT) failures or timing failures (e.g., nets with negative slack and/or pins exceeding slew limits). Identification and correction of any NIOF failures may be performed after the IC design is fully routed in the physical domain, and after the IC design is determined to be positive in terms of slack. In some cases, full routing may be needed to determine relatively accurate 3-dimensional coupling scenarios that allow NIOF analysis.

Turning now to FIG. 1A, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the context of computer system executable instructions, such as program modules, being executed by a computer system. Program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1A, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits or processing devices, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of the instructions during operation. The system memory 103 can include RAM, ROM, flash memory, or any other suitable memory systems.

The computer system 100 further includes an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1A.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others including combinations thereof. An external computing device may connect to the computer system 100 through the network 112. In some examples, an external computing device may be an external webserver or a cloud computing node.

It is to be understood that the block diagram of FIG. 1A is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

FIG. 1B depicts a block diagram of a system 120 to perform NIOF reduction for an IC design according to one or more embodiments described herein. The system 120 includes processing circuitry (e.g., the computing system 100) used to generate the design that is ultimately fabricated into an integrated circuit 130. The steps involved in the fabrication of the integrated circuit 130 are well-known and briefly described herein. Once the physical layout is finalized, based, in part, on NIOF reduction for an IC design according to one or more embodiments described herein to facilitate optimization of the routing plan, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 1C.

Figure 1C:
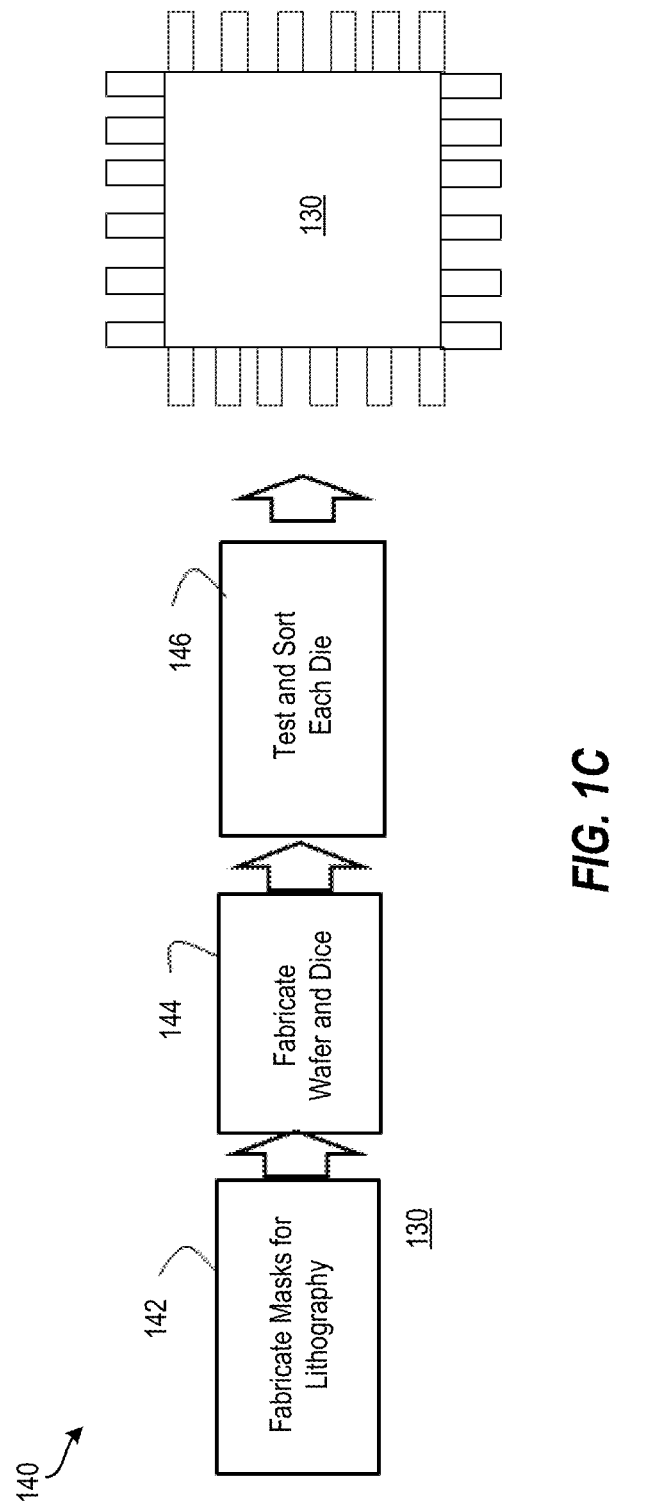
FIG. 1C depicts a process flow of a method of fabricating the integrated circuit according to one or more embodiments described herein.

FIG. 1C depicts a process flow of a method 140 of fabricating the integrated circuit according to one or more embodiments described herein. Once the physical design data is obtained, based, in part, on NIOF reduction for an IC design according to one or more embodiments described herein to facilitate optimization of the routing plan, the integrated circuit 130 can be fabricated according to known processes that are generally described with reference to FIG. 1C. Generally, a wafer with multiple copies of the final design is fabricated and cut (i.e., diced) such that each die is one copy of the integrated circuit 130. At block 142, the processes include fabricating masks for lithography based on the finalized physical layout. At block 144, fabricating the wafer includes using the masks to perform photolithography and etching. Once the wafer is diced, testing and sorting each die is performed, at block 146, to filter out any faulty die.

Figure 2:
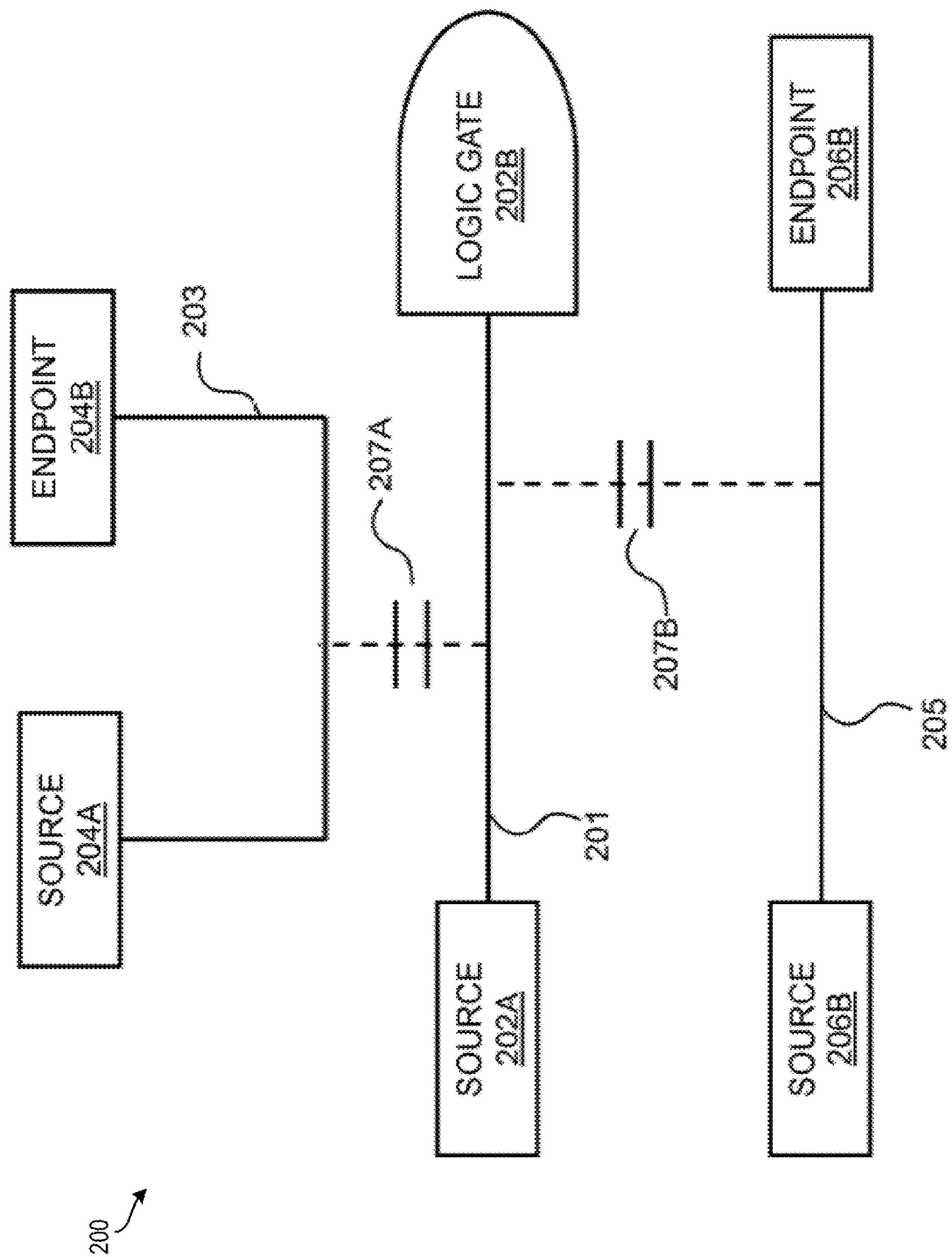
FIG. 2 depicts a system for NIOF reduction for an IC design is generally shown according to one or more embodiments described herein.

Turning now to FIG. 2, a system 200 for NIOF reduction for an IC design is generally shown according to one or more embodiments described herein. System 200 illustrates a victim net 201 and aggressor nets 203 and 205. Victim net 201 includes source 202A and logic gate 202B connected by a wire. Due to noise induced in victim net 201 by aggressor nets 203 and 205, an output of the logic gate 202B may be flipped from its expected value (signal switching). Aggressor net 203 includes source 204A and endpoint 204B connected by a wire, and aggressor net 205 includes source 206A and endpoint 206B connected by a wire. Aggressor net 203 may induce noise in victim net 201 via capacitive coupling 207A between the wire of victim net 201 and the wire of aggressor net 203. Aggressor net 205 may induce noise in victim net 201 via capacitive coupling 207B between the wire of victim net 201 and the wire of aggressor net 205. In some cases, a NIOF failure in victim net 201 is due to the sum of the individual contributions of both of aggressor net 203 and aggressor net 205. In other cases, a NIOF failure in victim net 201 is due to one of the capacitive couplings 207A, 207B individually. As shown in system 200, capacitive coupling 207A may be greater than capacitive coupling 207B, due for example to a smaller physical distance between aggressor net 203 and victim net 201 as compared to the distance between aggressor net 205 and victim net 201. Another example happens when net 205 is closer to net 201 for a longer distance than net 203 is closer to net 201. In order to correct the NIOF failure in victim net 201, in various embodiments, the noise contributions from both aggressor nets 203 and 205 may be reduced, or only the aggressor net having the greater noise contribution (e.g., net 203) may be targeted for NIOF reduction.

FIG. 2 is shown for illustrative purposes only; in various embodiments, there may be any appropriate number (e.g., 10 or higher) of aggressor nets such as aggressor nets 203 and 205 that are inducing noise in a victim net such as victim net 201. In some embodiments, dominant noise contributors (e.g., aggressor net 203) may be targeted for NIOF reduction before lesser contributors (e.g., aggressor net 205). In embodiments in which a wire optimization technique is used, an aggressor net that may be promoted or demoted to another layer of the IC design with relatively low effect on the rest of the IC design may be targeted for NIOF reduction. Embodiments of NIOF reduction that may be applied in system 200 are discussed in further detail.

It is to be understood that the block diagram of FIG. 2 is not intended to indicate that the system 200 is to include all of the components shown in FIG. 2. Rather, the system 200 can include any appropriate fewer or additional components not illustrated in FIG. 2 (e.g., nets, logic gates, wires, sources, endpoints, capacitive couplings, wires, additional memory components, embedded controllers, functional blocks, connections between functional blocks, modules, inputs, outputs, etc.). Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3A:
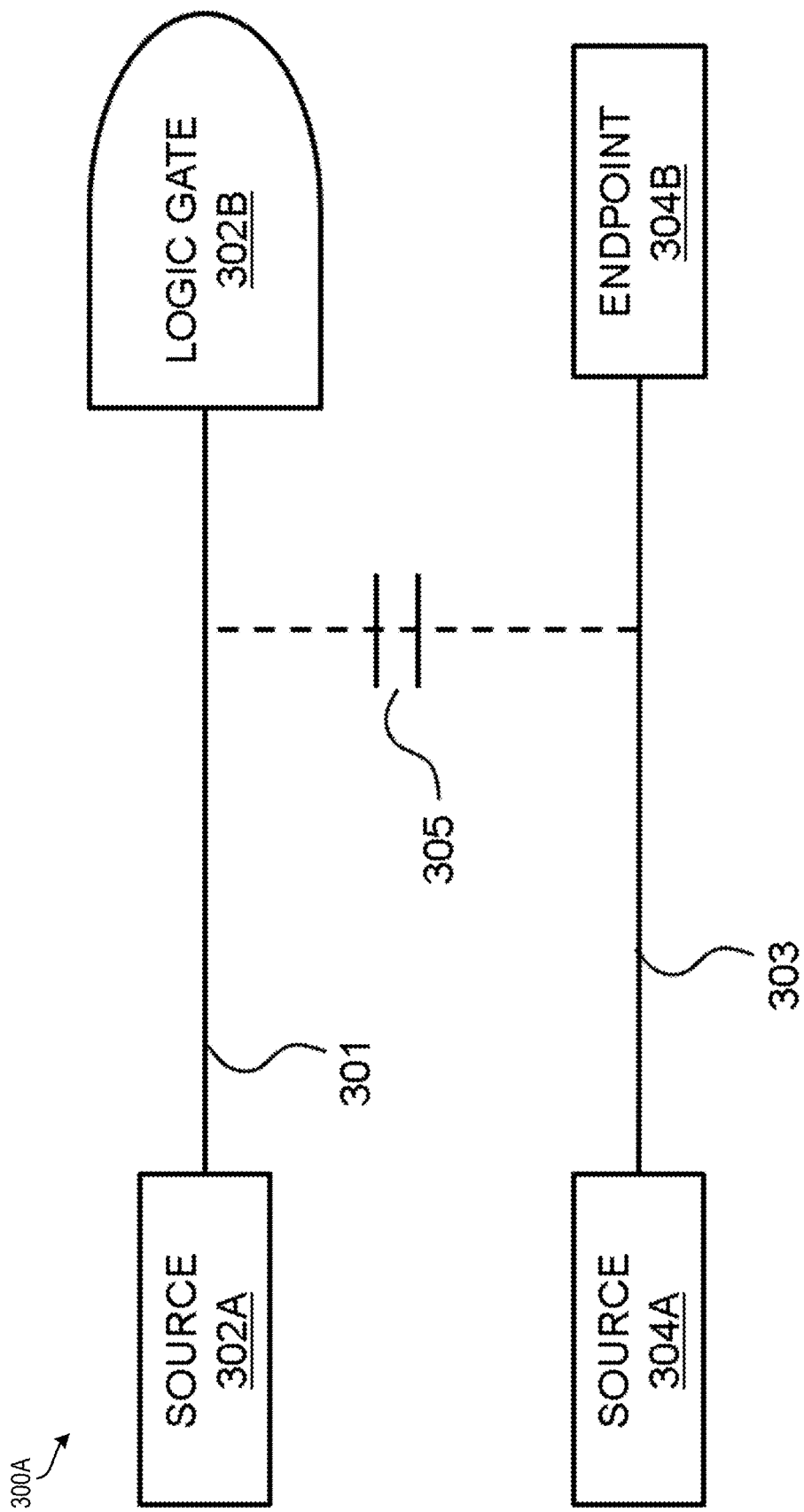
FIGS. 3A and 3B depict another system for NIOF reduction for an IC design in according to one or more embodiments described herein.
Figure 3B:
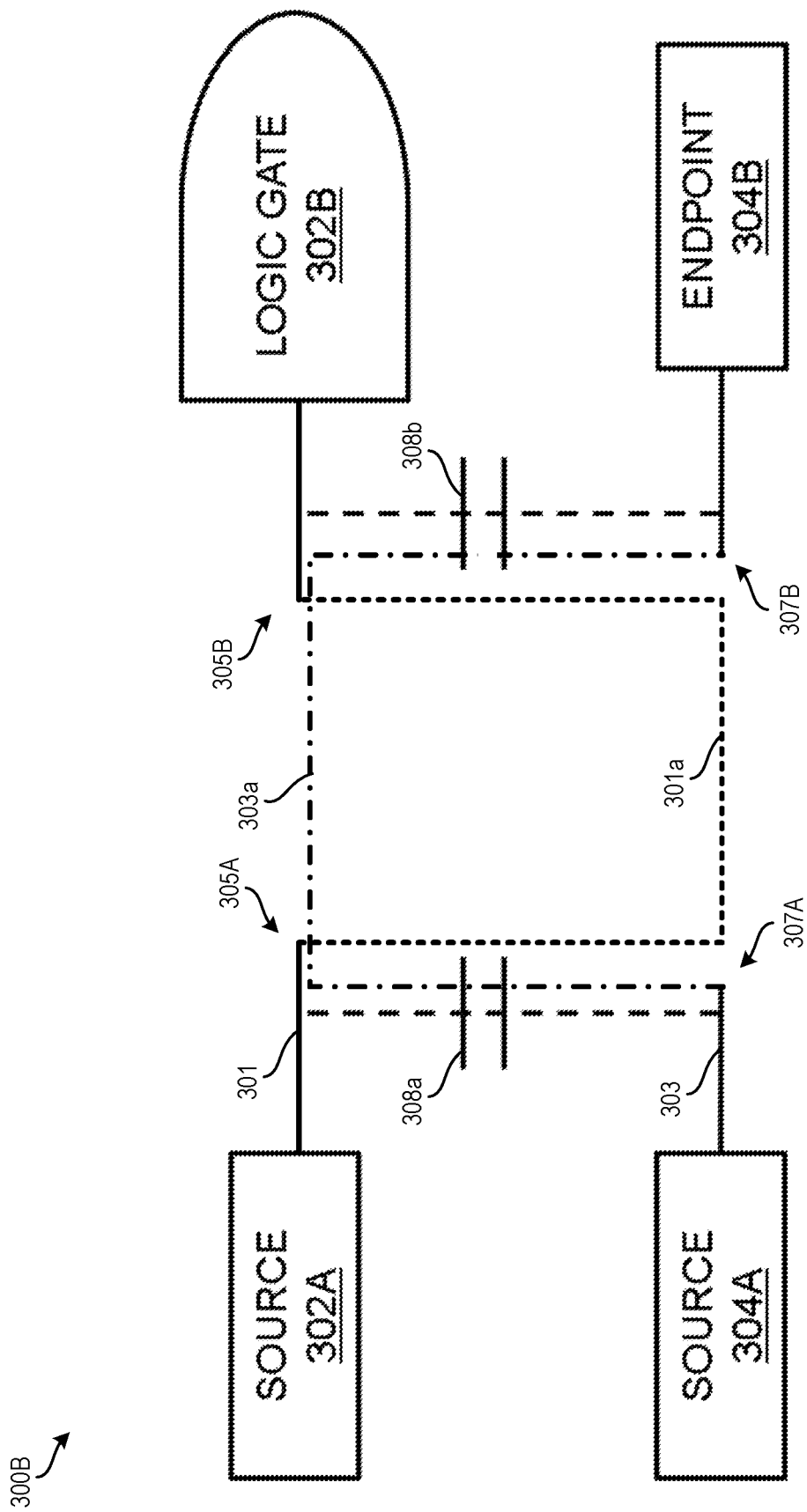

FIGS. 3A and 3B depict other systems 300A-B for NIOF reduction for an IC design in according to one or more embodiments described herein. As shown in system 300A of FIG. 3A, a first net 301, which includes a source 302A and a logic gate 302B connected by a wire, may experience a NIOF failure due to capacitive coupling 305 to a second net 303, which includes a source 304A connected to an endpoint 304B. As shown in system 300B, the first net 301 and the second net 303 are rerouted to reduce the capacitive coupling 305.

For example, the first net 301 is severed at locations 305a, 305b and is rerouted as shown by the dotted line 301a. Similarly, the second net 303 is severed at locations 307a, 307b and is rerouted as shown by the dotted/dashed line 303a.

In this way, the capacitive coupling 305 is eliminated and replaced by capacitive coupling 308a, 308b, which are each less than the capacitive coupling 305. By rerouting the nets 301, 303, the capacitive coupling 305 is thereby reduced, which should aid in preserving the integrity of the logic gate 302B. That is, the capacitive coupling 305 should not cause an output of the logic gate 302B to flip.

It is to be understood that the block diagram of FIG. 3 is not intended to indicate that the system 300 is to include all of the components shown in FIG. 3. Rather, the system 300A-B can include any appropriate fewer or additional components not illustrated in FIG. 3 (e.g., additional memory components, embedded controllers, functional blocks, connections between functional blocks, modules, inputs, outputs, etc.). Further, the embodiments described herein with respect to system 300 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 4:
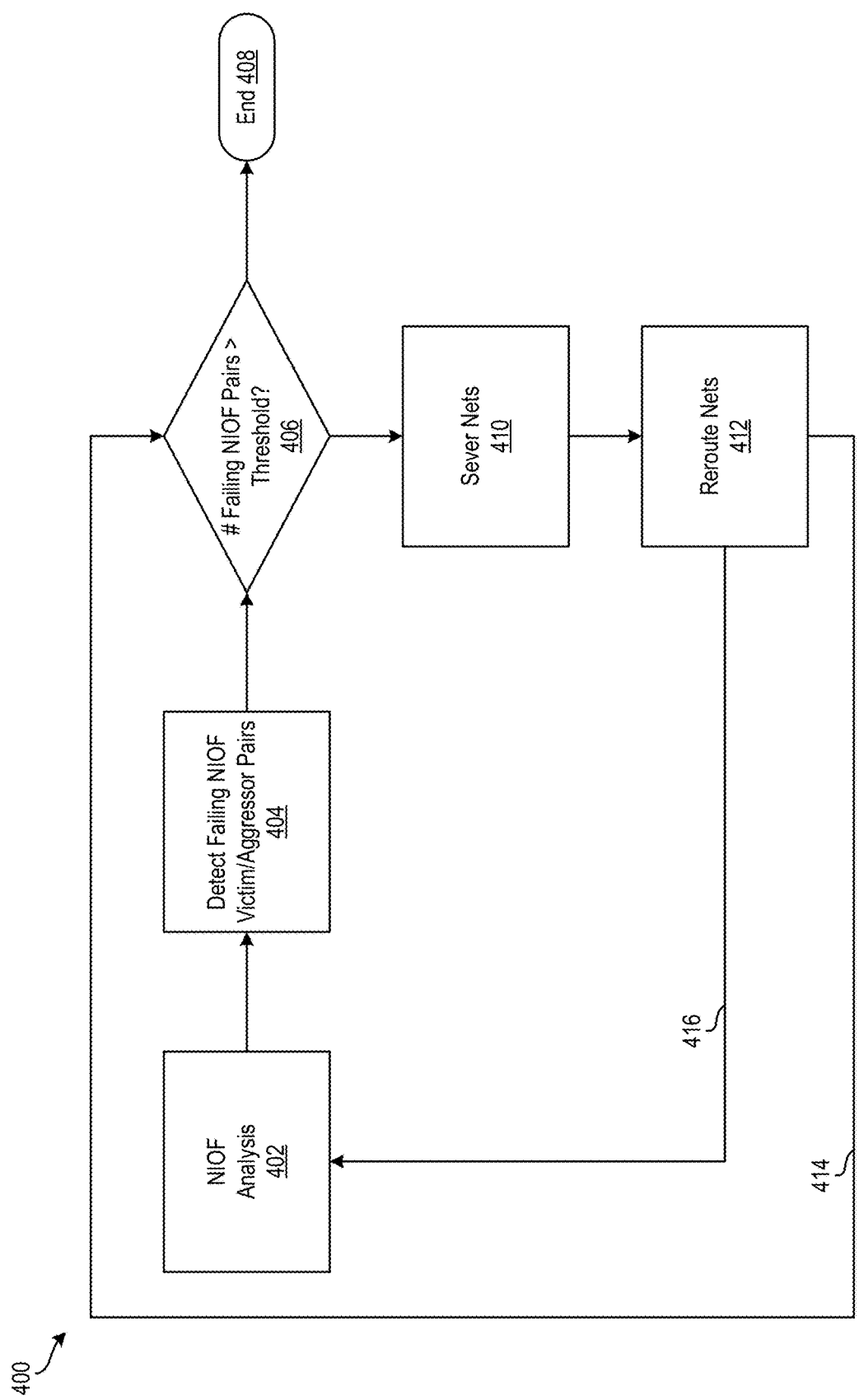
FIG. 4 depicts a flow diagram of a method for NIOF reduction for an IC design according to one or more embodiments described herein.

FIG. 4 depicts a flow diagram of a method 400 for NIOF reduction for an IC design according to one or more embodiments described herein. The method 400 can be performed by any suitable device or system, such as the computing system 100 of FIG. 1A.

At block 402, an NIOF analysis is performed. The NIOF analysis can be performed by the computing system 100 or by another suitable device or system. The NIOF analysis analyzes an IC design to detect when a gate in a victim net in the IC design changes its output logic state (signal switching) due to noise that is injected into one or more inputs of the gate. The noise injection may occur because of capacitive coupling in the IC, due to routed signals being relatively close to one another such that sufficient voltage is generated to change the signal state in the victim net.

At block 404, the computing system 100 detects failing NIOF victim/aggressor pairs. For example, the computing system 100 detects two nets that have a capacitive coupling that is known (or anticipated) to cause the victim net to change its output logic state. Multiple failing NIOF victim/aggressor pairs can be detected at block 404. As used herein, the term "aggressor" net refers to a net that causes interference with another net and the term "victim" net refers to a net that is interfered with by another net (i.e., the aggressor net). It should be appreciated that, in a first pair of failing NIOF victim/aggressor pairs, the victim net could also be an aggressor net in a second pair of failing NIOF victim/aggressor pairs. In some examples, the detecting at 404 is performed as part of the NIOF analysis.

At decision block 406, the computing system 100 compares a number of the detected failing NIOF victim/aggressor pairs to a threshold. The threshold, which may be adjustable, indicates a number of detected failing NIOF victim/aggressor pairs that is acceptable. If it is determined at decision block 406 that the number of the detected failing NIOF victim/aggressor pairs does not satisfy the threshold (e.g., is less than the threshold), the method 400 ends 408. However, if it is determined at decision block 406 that the number of the detected failing NIOF victim/aggressor pairs satisfies the threshold (e.g., too many failing NIOF victim/aggressor pairs), the method 400 proceeds to blocks 410, 412, which are collectively referred to a "chop and swap" operation. Particularly, at block 410, the routes of two nets (one identified as aggressor and other identified as victim) are severed at the begin and end portions identified to be where coupling occurs. The severing process is surgically performed to only break the connection. The majority of the routed segments are still in the design. The severed segments swap places with each other and correctly re-assigned to the corresponding nets. At block 412, the severed net(s) are rerouted (e.g., an engineering change order ("ECO") routing is performed) to reconnect the severed route. Since the routes are originally next to each other the swapping of segments provides for finding a free location. This is also true if the segments have different widths. As such, besides swapping, an extra step of moving the fatter wire maybe implemented. In the tool implementation, the move step may be skipped because the ECO router takes care of legalizing the location of the segments and re-routing the severed ends. The features and functions of the blocks 410, 412 are described in further detail with reference to FIG. 5.

According to one or more embodiments described herein, after the ECO routing is performed at block 412, the method 400 can continue to perform chop and swap operations (block 410) and ECO routing (block 412) while the number of failing NIOF pairs is greater than the threshold as determined at block 406 (see arrow 414). According to one or more embodiments described herein, after the ECO routing is performed at block 412, the NIOF analysis can be performed again on the modified IC design at block 402 (see arrow 416).

Additional processes also may be included, and it should be understood that the process depicted in FIG. 4 represents an illustration, and that other processes may be added, or existing processes may be removed, modified, or rearranged without departing from the scope of the present disclosure.

Figure 5:
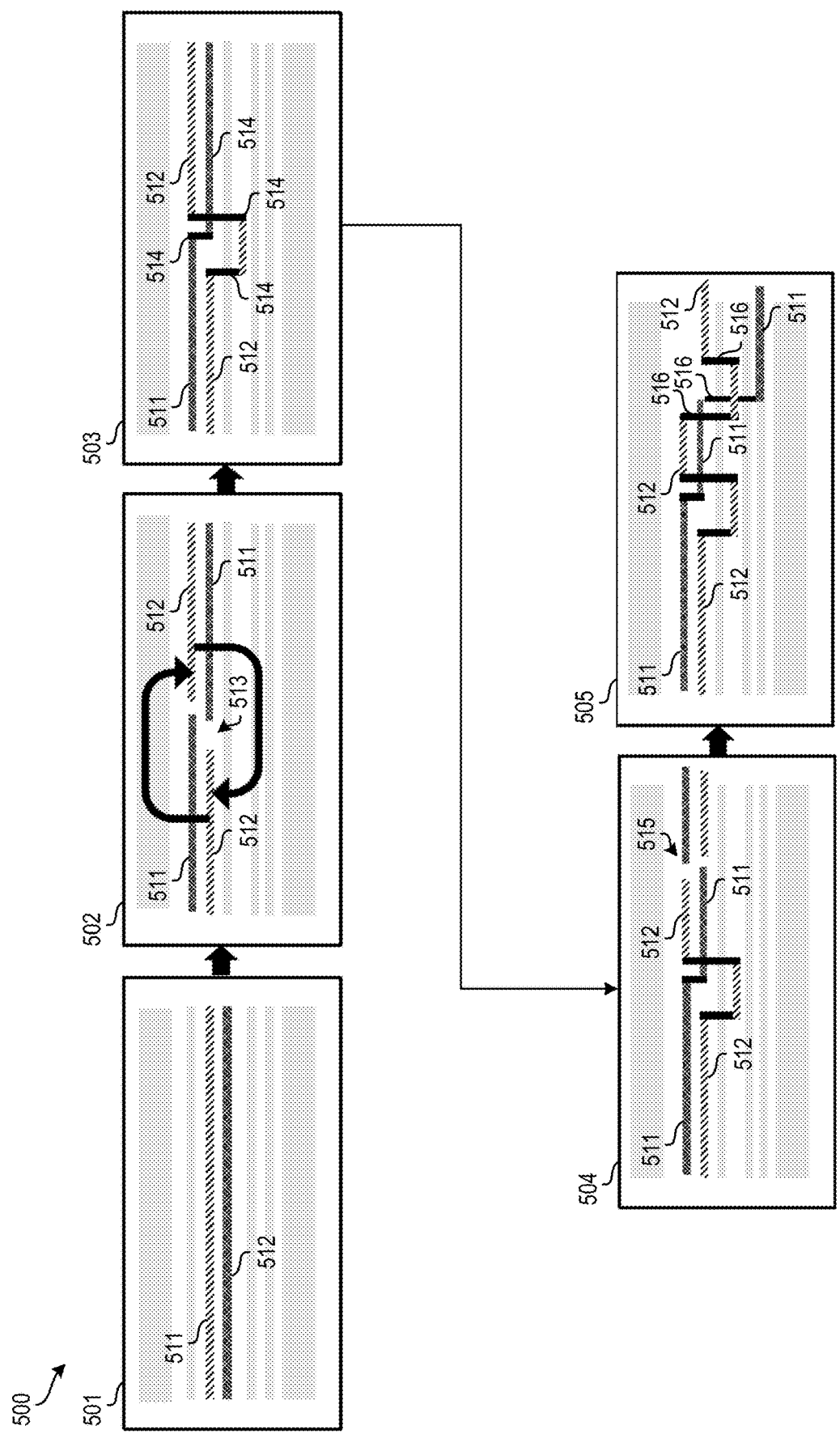
FIG. 5 depicts a flow diagram of a method for NIOF reduction for an IC design according to one or more embodiments described herein.

FIG. 5 depicts a flow diagram of a method 500 for NIOF reduction for an IC design according to one or more embodiments described herein. In this example, what is referred to as a "chop and swap" operation is performed.

At block 501, two nets 511, 512 are shown. The net 511 is the victim net and the net 512 is the aggressor net, as determined at blocks 402 and/or 404 of FIG. 4. At block 502, the chop and swap (see block 410) is performed. As shown, the two nets 511, 512 are severed and swapped at a location 513. The location 513 can be determined, for example, based on a distance of the net 511 and/or a distance of the net 512. For example, a center point (based on the distance of the net) can be determined, and the location can be within a certain percentage of the distance away from the center point. It should be appreciated that, in some example, two locations for severing the nets 511, 512 are determined for each victim/aggressor pairs such that the chop and swap is performed at both locations. At block 503, the two nets 511, 512 are reconnected using ECO routing (see block 412) as shown by the connections 514. Together, blocks 501-503 represent one cycle of performing the chop and swap and routing of blocks 410, 412 of FIG. 4. In many swapping scenarios, the swap of wire segments happens in place using the existing locations of such wires. However, in another embodiment it is possible to move one segment to nearby free locations. By performing such move, the coupling contribution to the functional failure on the victim net is removed. In some cases, such move is performed after some conditions are satisfied. Consider the following example: First, no other technique can be used to remove the functional failure. Second, an empty location must exist within a pre-defined search window. The size of the window is determined by delay constraints since to avoid adding delay to net. Third, the move of the net to the new location may not happen if it ends up causing an adverse coupling event into nearby nets, such as increased delay to the new neighbor nets as well as introduce a new functional failure. The decision process takes into account the length of the segment and the amount of coupling contribution to a functional failure onto the new neighbor net(s). Fourth, ECO routing must succeed for this scenario.

In some embodiments, the chop and swap and routing can be performed iteratively through multiple cycles as shown by blocks 504, 505. Particularly, in block 504, the chop and swap (see block 410) is performed. As shown, the two nets 511, 512 are severed and swapped again, this time at a location 515. At block 504, the two nets 511, 512 are reconnected using ECO routing (see block 412) as shown by the connections 516. In examples, the chop and swap may happen several times on a net or a set of nets prior to ECO routing. The number of times is determined empirically and passed to the flow as a parameter. Too few chop and swap steps results in the runtime becoming prohibitive because of too many calls to NIOF analysis. Too many chop and swap steps results in the design becoming too stale for the NIOF analysis to be reliable. By finding the right balance between chop and swap steps, ECO route, and NIOF analysis, the process can be repeated multiple times, such as until the number of the detected failing NIOF victim/aggressor pairs does not satisfy the threshold (see decision block 406), a predetermined number of times, until the number of the detected failing NIOF victim/aggressor pairs is zero, etc.

Figure 6:
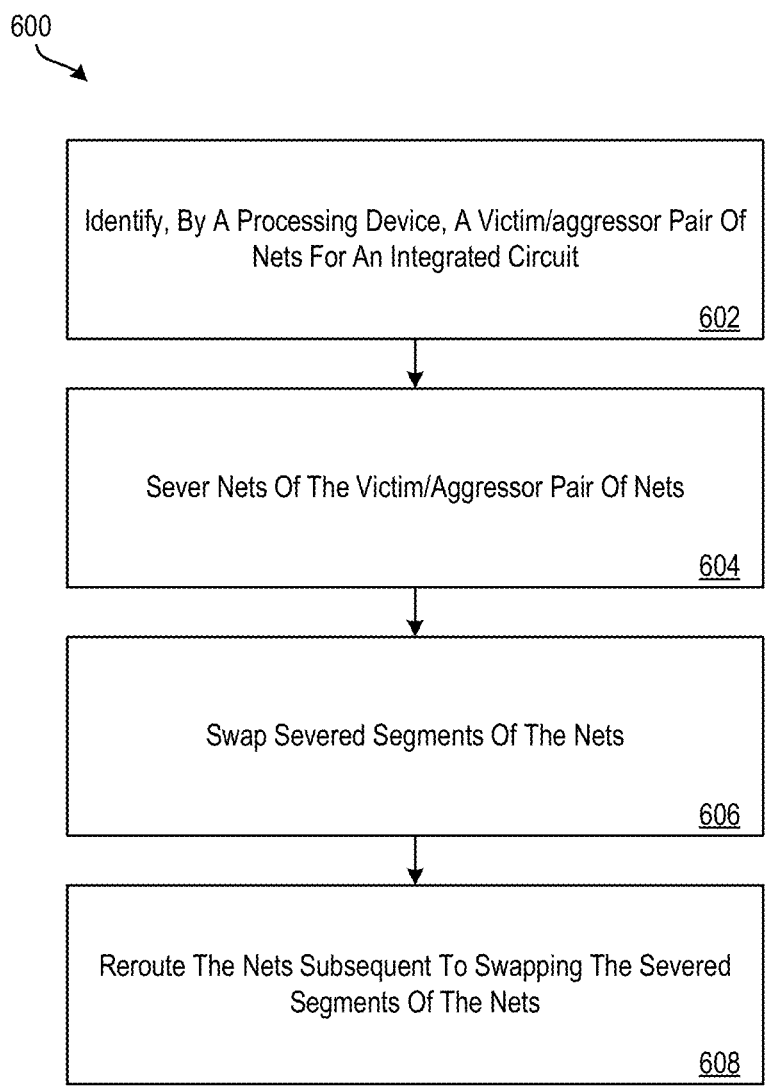
FIG. 6 depicts a flow diagram of a method for NIOF reduction for an IC design according to one or more embodiments described herein.

FIG. 6 depicts a flow diagram of a method 600 for NIOF reduction for an IC design according to one or more embodiments described herein. The method 600 can be performed by any suitable device or system, such as the computing system 100 of FIG. 1A. At block 602 a processing device (e.g., the processor 101 of the computing system 100) identifies a victim/aggressor pair of nets for an integrated circuit. At block 604, nets of the victim/aggressor pair of nets are severed. This results in severed segments, which are the portions of the net that are severed. At block 606, the severed nets are swapped. At block 608, the nets are rerouted subsequent to swapping the severed segments of the nets. Additional processes also may be included, and it should be understood that the process depicted in FIG. 6 represents an illustration, and that other processes may be added, or existing processes may be removed, modified, or rearranged without departing from the scope of the present disclosure.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    identifying, by a processing device, a first victim-aggressor pair of nets and a second first victim-aggressor pair of nets for an integrated circuit;
    severing nets of the first victim-aggressor pair of nets and for the second victim-aggressor pair of nets to create a first severed segment between the first victim-aggressor pair of nets and a second severed segment between the second victim-aggressor pair of nets;
    swapping the first severed segments of the first victim-aggressor pair of nets with the second severed segment of the second victim-aggressor pair of nets; and
    rerouting the first victim-aggressor pair of nets and the second victim-aggressor pair of nets subsequent to the swapping.

2. The computer-implemented method of claim 1, wherein identifying the first victim-aggressor pair of nets comprises:
    detecting that a gate in a victim net of the first victim-aggressor pair of nets in the integrated circuit changes an output logic state due to noise that is injected into one or more inputs of the gate.

3. The computer-implemented method of claim 2, wherein the noise is caused by a capacitive coupling between the nets of the first victim-aggressor pair of nets.

4. The computer-implemented method of claim 1, wherein severing the nets, swapping the severed segments, and rerouting the nets are performed iteratively.

5. The computer-implemented method of claim 1, wherein severing the nets, swapping the severed segments, and rerouting the nets are performed iteratively until a threshold number of victim-aggressor pair of nets for the integrated circuit is satisfied.

6. The computer-implemented method of claim 1, wherein severing the nets, swapping the severed segments and rerouting the nets are performed iteratively until the integrated circuit contains no victim-aggressor pairs of nets.

7. The computer-implemented method of claim 1, further comprising:
  prior to severing the nets, determining a location to sever the first victim-aggressor pair of nets.

8. The computer-implemented method of claim 7, wherein the location is based at least in part on a distance of one of the nets of the first victim-aggressor pair of nets.

9. A system comprising:
  a memory comprising computer readable instructions; and
  a processing device for executing the computer readable instructions, the computer readable instructions controlling the processing device to perform operations comprising:
    identifying a first victim-aggressor pair of nets and a second first victim-aggressor pair of nets for an integrated circuit;
    causing nets of the first victim-aggressor pair of nets and the second victim-aggressor pair of nets to sever to create a first severed segment between the first victim-aggressor pair of nets and a second severed segment between the second victim-aggressor pair of nets;
    causing the first severed segments of the first victim-aggressor pair of nets to be swapped with the second severed segment of the second victim-aggressor pair of nets; and
    causing the first victim-aggressor pair of nets and the second victim-aggressor pair of nets to be rerouted subsequent to swapping the first severed segments and the second severed segment.

10. The system of claim 9, wherein identifying the first victim-aggressor pair of nets comprises:
  detecting that a gate in a victim net of the first victim-aggressor pair of nets in the integrated circuit changes an output logic state due to noise that is injected into one or more inputs of the gate.

11. The system of claim 10, wherein the noise is caused by a capacitive coupling between the nets of the first victim-aggressor pair of nets.

12. The system of claim 9, wherein causing the nets to be severed, causing the severed segments to be swapped, and causing the nets to be rerouted are performed iteratively.

13. The system of claim 9, wherein causing the nets to be severed, causing the severed segments to be swapped, and causing the nets to be rerouted are performed iteratively until a threshold number of victim-aggressor pair of nets for the integrated circuit is satisfied.

14. The system of claim 9, wherein causing the nets to be severed, causing the severed segments to be swapped, and causing the nets to be rerouted are performed iteratively until the integrated circuit contains no victim-aggressor pairs of nets.

15. The system of claim 9, processing device to perform operations further comprising:
  prior to causing the nets to be severed, determining a location to sever the nets.

16. The system of claim 15, wherein the location is based at least in part on a distance of one of the nets of the victim-aggressor pair of nets.

17. A computer program product comprising a non-transitory computer readable storage medium having program instructions embodied therewith, the program instructions executable by a processor to cause the processor to perform operations comprising:
  identifying a first victim-aggressor pair of nets and a second first victim-aggressor pair of nets for an integrated circuit;
  causing nets of the first victim-aggressor pair of nets and the second victim-aggressor pair of nets to sever to create a first severed segment between the first victim-aggressor pair of nets and a second severed segment between the second victim-aggressor pair of nets;
  causing the first severed segments of the first victim-aggressor pair of nets to be swapped with the second severed segment of the second victim-aggressor pair of nets; and
  causing the first victim-aggressor pair of nets and the second victim-aggressor pair of nets to be rerouted subsequent to swapping the severed segment and the second severed segment.

18. The computer program product of claim 17, wherein identifying the first victim-aggressor pair of nets comprises:
  detecting that a gate in a victim net of the first victim-aggressor pair of nets in the integrated circuit changes an output logic state due to noise that is injected into one or more inputs of the gate.

19. The computer program product of claim 18, wherein the noise is caused by a capacitive coupling between the nets of the first victim-aggressor pair of nets.

20. The computer program product of claim 17, wherein causing the nets to be severed, causing the severed segments to be swapped, and causing the nets to be rerouted are performed iteratively.

\* \* \* \* \*